United States Patent [19]
Csomontanyi et al.

[11] 3,862,207
[45] Jan. 21, 1975

[54] PROCESS FOR PREPARING HIGH-POROSITY CATALYSTS FOR THE DEHYDROGENATION

[76] Inventors: Georgeta Csomontanyi, Str. Nordului 4, Ploiesti; Vladimir Mocearov, Str. C.A. Rossetti, 34, Bucharest; Alexandru Panovici, Str. Cameliei, 17 bis, Ploiesti; Viorel Biceaga, Str. Libertatii No. 6, Or. Gh. Gheorghio-Dej, all of Romania

[22] Filed: Nov. 1, 1971

[21] Appl. No.: 194,615

[52] U.S. Cl............. 252/470, 252/443, 252/430
[51] Int. Cl.............................. B01j 11/22
[58] Field of Search............... 252/430, 443, 470

[56] References Cited
UNITED STATES PATENTS

| | | | |
|---|---|---|---|
| 2,408,140 | 9/1946 | Gutzeit | 252/470 |
| 2,457,719 | 12/1948 | Pine et al. | 252/470 X |
| 2,666,086 | 1/1954 | Pitzer | 252/470 X |
| 2,866,790 | 12/1958 | Pitzer | 252/470 X |
| 2,929,792 | 3/1960 | Arnold et al. | 252/430 |
| 2,971,927 | 2/1961 | Price | 252/443 |
| 3,051,662 | 8/1962 | Pitzer et al. | 252/430 |
| 3,168,524 | 2/1965 | Mahan et al. | 252/470 X |
| 3,360,579 | 12/1967 | Hills et al. | 252/470 X |
| 3,364,277 | 1/1968 | Siem | 252/443 X |
| 3,385,798 | 5/1968 | Mahan et al. | 252/470 |

*Primary Examiner*—Paul F. Shaver
*Attorney, Agent, or Firm*—Karl F. Ross; Herbert Dubno

[57] ABSTRACT

A catalyst for the dehydrogenation of hydrocarbons is formed by extruding or shaping a catalyst paste containing $Fe_2O_3$, chromium oxide and potassium carbonate, and 5 percent to 30 percent by weight of polystyrene in the form of beads or extruded particles with a particle size of 0.1 to 0.6 mm.

3 Claims, No Drawings

PROCESS FOR PREPARING HIGH-POROSITY CATALYSTS FOR THE DEHYDROGENATION

FIELD OF THE INVENTION

The present invention relates to a process for producing high-porosity catalysts for the dehydrogenation of hydrocarbons, especially for the dehydrogenation of olefins and alkylbenzenes to the corresponding dienes and vinylbenzenes and to a catalyst formed by the improved process.

BACKGROUND OF THE INVENTION

The catalytic dehydrogenation of hydrocarbons using catalysts containing ferric oxides, chromium oxides and potassium carbonate, e.g., in an amount of 32 to 50 percent by weight, is well known for conversion of olefins and alkylbenzenes to corresponding dienes and vinylbenzenes. Such catalysts have high yields but are of limited or poor selectivity in the sense that it is difficult to provide a catalyst which will be highly selective although the yields may be satisfactory.

OBJECTS OF THE INVENTION

It is the principal object of the present invention to provide an improved method of making a catalyst for the dehydrogenation of organic compounds, especially olefins and alkylbenzenes, which will yield a catalyst characterized by high yield, long life and good selectivity for the dienes and vinylbenzenes which are desired.

It is also an object of the present invention to provide an improved catalyst with the characteristics described.

Yet another object of the invention is to provide an improved system for dehydrogenating hydrocarbons.

SUMMARY OF THE INVENTION

We have discovered, most surprisingly, that the foregoing objects can be achieved with a method of producing a catalyst for the dehydrogenation of hydrocarbons, especially the conversion of mono-olefins and alkylbenzenes, to diolefins and vinylbenzenes, respectively, which comprises forming a catalyst paste preferably consisting in major part of ferric oxide or in combination with chromium oxide and potassium carbonate, and extruding the resulting paste. The invention comprises introducing into the paste, prior to extrusion, between 5 and 30 percent by weight of the final catalyst of polystyrene particles (preferably about 20 percent by weight) with a particle size between 0.1 and 0.6 mm (preferably about 0.3 mm in diameter). After extrusion the polystyrene particles incorporated into the catalytic mass are removed by depolymerisation and burning upon calcination of the extruded mass, thus achieving a macroporous structure which promotes the main reaction, dehydrogenation to vinylbenzene and diolefines, with highest selectivities.

Preferably, the catalyst is used for the dehydrogenation of olefins containing 2 to 7 carbon atoms and alkylbenzenes containing from 1 to 7 carbon atoms in the alkyl moiety. The dehydrogenation reaction is preferably carried out at a temperature between 450° and 700°C, preferably between 500° and 675°C, in the presence of water vapor in a molar ratio of water vapor to the hydrocarbon to be dehydrogenated of 10:1 to 20:1.

According to a further feature of the invention, the extruded catalyst is calcined at a temperature between 590° and 800°C, the temperature being gradually increased within this range to the breakdown temperature of pyrolytic decomposition temperature of the polystyrene.

SPECIFIC EXAMPLES

Example I 600 g of $Fe_2O_3$, prepared by precipitation by ammonia or another base from an aqueous solution containing ferric ions, is dried at 100°C and calcined at 850°C for a period of 6 to 12 hours. The iron oxide is mixed with 23 g of green chromium oxide and then with 350 g of a 750 g/liter solution of potassium carbonate to yield a paste which is homogenized by kneading at a temperature sufficient to evaporate water so that the paste at the end of the kneading operation contains 13 to 15 percent by weight moisture.

206 g of 0.3 mm diameter polystyrene beads was then added and kneading of the paste continued to a homogeneous condition whereupon the paste was extruded into catalyst bodies. The extruded catalyst bodies were dried at 110°C and then calcined at 590° to 800°C, the temperature being gradually raised to the latter level over a period of 6 hours. The resulting catalyst had a porosity of over 50 percent (ratio of pore volume to total volume), with 80 percent of the pores having diameters of over 1,300 A as determined by a mercury porosimeter.

Example II

The catalyst of Example I was used for the dehydrogenation of n-butene at a temperature of 650°C at a 700 $hr^{-1}$ liquid space velocity and a $H_2O$: butene by weight ratio of 10:1. 24 to 29 mole percent butadienes were recovered with about 80 mole percent selectivity.

Example III

Using bench scale equipment similar to the one employed in Example II, the catalyst was used for the dehydrogenation of isopropylbenzene. At a temperature of 540°C, a liquid space velocity of 0.5 $hr^{-1}$, and a $H_2O$: hydrocarbon ratio of 3:1 by weight. The product contained 40 to 45 weight percent alphamethylstyrene with a selectivity of 92 to 94 percent by weight.

Example IV

Using the catalyst of Example I, ethylbenzene was dehydrogenated to styrene at a temperature of 560°C, a liquid space velocity of 0.5 $hr^{-1}$ and a $H_2O$ ethylbenzene ratio of 3:1 by weight. The yield was 38 to 42 percent by weight styrene with 90 percent by weight selectivity.

The foregoing Examples were repeated using a weight ratio of $Fe_2O_3$: chromium oxide between 15:1 and 40:1 and a weight ratio of iron oxide to potassium carbonate between 0.25:1 and 3.5:1; the potassium carbonate is preferably present in an amount of 32 percent to 50 percent by weight. Effective results were obtained also with iron oxide : polystyrene ratios of 1.5:1 to 5:1.

The system has the advantage that the selectivity is increased, specific consumption of raw material is decreased and the quantity of catalysts consumed per unit quantity of product is reduced.

We claim:

1. A method of making a catalyst for the dehydrogenation of hydrocarbons, comprising the steps of forming an extrudable catalyst paste consisting essentially of iron oxide, chromium oxide and potassium carbonate powders and waters, the iron oxide and the chromium oxide being in a weight ratio of 15:1 to 40:1, and the iron oxide and potassium carbonate being in a weight ratio of 0.25:1 to 3.5:1; mixing polystyrene beads with a particle size of 0.1 to 0.3 mm in an amount of 5 percent to 30 percent by weight of the final catalyst composition prior to calcination with said paste and extruding said paste to form catalyst bodies; and calcining said bodies to thermally decompose the polystyrene therein.

2. The method defined in claim 1 wherein substantially 20 percent by weight of the final catalyst of polystyrene particles is mixed with said paste.

3. A method of making a catalyst with increased selectivity for the dehydrogenation of mono-olefins to di-olefins and of alkyl benzenes to vinyl benzenes comprising the steps of forming an extrudable catalyst paste consisting essentially of iron oxide, chromium oxide and potassium carbonate, the iron oxide and the chromium oxide being in a weight ratio of 15:1 to 40:1, and the iron oxide and potassium carbonate being in a weight ratio of 0.25:1 to 3.5:1, the paste containing 32 to 50 percent of potassium carbonate with reference to the dry weight thereof; mixing the paste with polystyrene beads with a particle diameter distribution of 0.1 to 0.6 mm in an amount of 5 percent to 30 percent by weight of the solid matter of the paste; extruding the paste mixed with the polystyrene beads to form catalyst bodies; and calcining said bodies to thermally decompose the polystyrene therein.

* * * * *